United States Patent
Han

(10) Patent No.: US 10,761,235 B2
(45) Date of Patent: Sep. 1, 2020

(54) APPLYING E-FIELD ANTENNAS TO RESISTIVITY LOGGING TOOLS

(71) Applicant: Weishan Han, Katy, TX (US)

(72) Inventor: Weishan Han, Katy, TX (US)

( * ) Notice: Subject to any disclaimer, the term of this patent is extended or adjusted under 35 U.S.C. 154(b) by 45 days.

(21) Appl. No.: 16/091,056

(22) PCT Filed: Oct. 31, 2016

(86) PCT No.: PCT/US2016/059727
§ 371 (c)(1),
(2) Date: Oct. 3, 2018

(87) PCT Pub. No.: WO2018/080540
PCT Pub. Date: May 3, 2018

(65) Prior Publication Data
US 2019/0120993 A1    Apr. 25, 2019

(51) Int. Cl.
*G01V 3/28* (2006.01)
*G01V 3/20* (2006.01)
*G01V 3/18* (2006.01)
*G01V 3/38* (2006.01)

(52) U.S. Cl.
CPC .................. *G01V 3/28* (2013.01); *G01V 3/18* (2013.01); *G01V 3/20* (2013.01); *G01V 3/38* (2013.01)

(58) Field of Classification Search
CPC .... G01V 2200/16; G01V 11/005; G01V 5/04; G01V 3/28; G01V 3/18; G01V 3/20; G01V 3/38; G01V 1/40; G01V 5/02; G01V 2210/6169; G06N 7/005; G06N 20/00; G06N 3/084; G06N 3/0445; G06N 3/0454; G06N 3/006; G06N 3/02; G06N 5/04
See application file for complete search history.

(56) References Cited

U.S. PATENT DOCUMENTS

| | | | |
|---|---|---|---|
| 5,345,179 A | 9/1994 | Harbashy et al. | |
| 6,064,210 A * | 5/2000 | Sinclair | G01V 3/20 324/338 |
| 7,525,315 B2 | 4/2009 | Fredette et al. | |
| 2003/0076107 A1* | 4/2003 | Fanini | G01V 3/28 324/339 |
| 2004/0046561 A1* | 3/2004 | Itskovich | G01V 3/28 324/339 |
| 2005/0068036 A1 | 3/2005 | Wang et al. | |
| 2007/0208546 A1* | 9/2007 | Fang | G01V 3/28 702/191 |
| 2012/0097450 A1* | 4/2012 | Wessling | E21B 47/002 175/50 |

(Continued)

OTHER PUBLICATIONS

International Search Report and Written Opinion dated Mar. 23, 2017 for related PCT Application No. PCT/US2016/059727.

*Primary Examiner* — Patrick Assouad
*Assistant Examiner* — Taqi R Nasir
(74) *Attorney, Agent, or Firm* — Enshan Hong; VLP Law Group LLP

(57) ABSTRACT

The present invention provides a methodology and system for resistivity tool design. By using at least one E field antenna instead of magnetic antennas, stronger signals can be captured by a smaller system. The more effective antenna design of the present invention has broad applications in various tools including geosteering, look ahead, and triaxial induction.

16 Claims, 18 Drawing Sheets

(56) References Cited

U.S. PATENT DOCUMENTS

| | | | | |
|---|---|---|---|---|
| 2014/0111209 A1* | 4/2014 | Gao | ............... | G01V 3/26 |
| | | | | 324/332 |
| 2015/0276968 A1* | 10/2015 | Frey | ............... | G01V 3/30 |
| | | | | 324/339 |
| 2016/0002977 A1* | 1/2016 | Wu | ............... | G01V 3/28 |
| | | | | 700/275 |

* cited by examiner

APPLYING E-FIELD ANTENNAS TO RESISTIVITY LOGGING TOOLS

FIELD OF INVENTION

The present invention relates generally to the field of resistivity logging tool design. In one embodiment, the present invention provides electromagnetic (EM) antenna system designs for Logging-While-Drilling (LWD) resistivity tools, such as geosteering, triaxial resistivity, and look ahead, etc.

BACKGROUND OF THE INVENTION

The antennas used for current resistivity tools are typically composed of one or several closed wire loops. When calculating the response of the antenna systems, these antennas can be simplified as one magnetic dipole or a combination of several magnetic dipoles with different normal directions. Thus those antennas which can be treated as magnetic dipoles are referred to as magnetic antennas. Since treating antennas as magnetic dipoles greatly simplifies its signal processing, magnetic antennas are broadly applied in current resistivity tools. However, magnetic antennas have disadvantages. For example, when a magnetic antenna is acting as a receiver, and effective signals are only coming from one direction, for any given part of the antenna, there always exists a corresponding part, called the counterpart, such that most of the signal generated by such given part of the antenna is canceled by its counterpart. The reason is that the most often used frequencies for LWD tools are in the megahertz range, which makes the wavelengths of an effective signal much longer than the antenna size. As a result, each part of the antenna receives a similar signal at any one moment. Because the antenna is a closed loop, each part of the antenna will have a counterpart that has the same length but wired in the opposite direction, and most of the signal received by these two parts will cancel each other. Therefore, the strength of the resulting signal received by the antenna would be greatly reduced. In conventional resistivity well logging tools, such as four-transmitter-two-receiver LWD resistivity tools, all transmitters and receivers are set along a long axle direction, and the effective signal is coming from all directions. The signal received by the magnetic antenna is not reduced in such cases. However, when detecting a boundary distance, geosteering systems only receive effective signals from one direction. As a result, the effective signal received by the conventional magnetic antenna is significantly reduced, and cannot meet the requirements of the drilling industry for both detection range and accuracy. Meanwhile, with the development of oil field exploration, more and more highly deviated or horizontal wells, where geosteering tools are broadly applied, are being drilled. In addition to geosteering, there is a similarly broad application for looking ahead tools and resistivity measurement in complex formations. The oil industry thus needs a more effective antenna design.

SUMMARY OF THE INVENTION

The present invention describes an effective system design for resistivity logging tools useful for measuring formation resistivity parameters during drilling. Unlike conventional resistivity systems, which contain only closed coil antennas, the present invention employs at least one E-field antenna. The E-field antenna not only helps the new system to capture stronger signals, but also helps to reduce the tool's size.

In one embodiment, the present invention provides a resistivity logging tool comprising one or more transmitting antennas and one or more receiving antennas, wherein at least one of the transmitting antennas or one of the receiving antennas is an electric field antenna.

In one embodiment, the present invention also provides a method of using the resistivity logging tool disclosed herein.

The drawings and following detail descriptions are examples to help understand the present invention which is susceptible to various modifications and alternative forms. The drawings and detailed description herein are not intended to limit the scope of the claims.

DETAILED DESCRIPTION OF THE INVENTION

As used herein, "magnetic antenna" refers to conventional antenna used in current resistivity tools. In general, the magnetic antennas are configured in closed shapes, such as a circle, a rectangle, or an ellipse, and can be treated as magnetic dipoles. Coil antenna is an example of magnetic antenna.

As used herein, "E field antenna" refers to antennas which detect electric field (E field) directly instead of magnetic field. Usually they are not configured in closed shapes, and cannot be simplified as magnetic dipoles in practice. Dipole antenna is an example of E field antenna.

As used herein, "effective signal" refers to the target signal an antenna is designed to receive, such signal directly contributes to the final measurement results.

Figure 1:
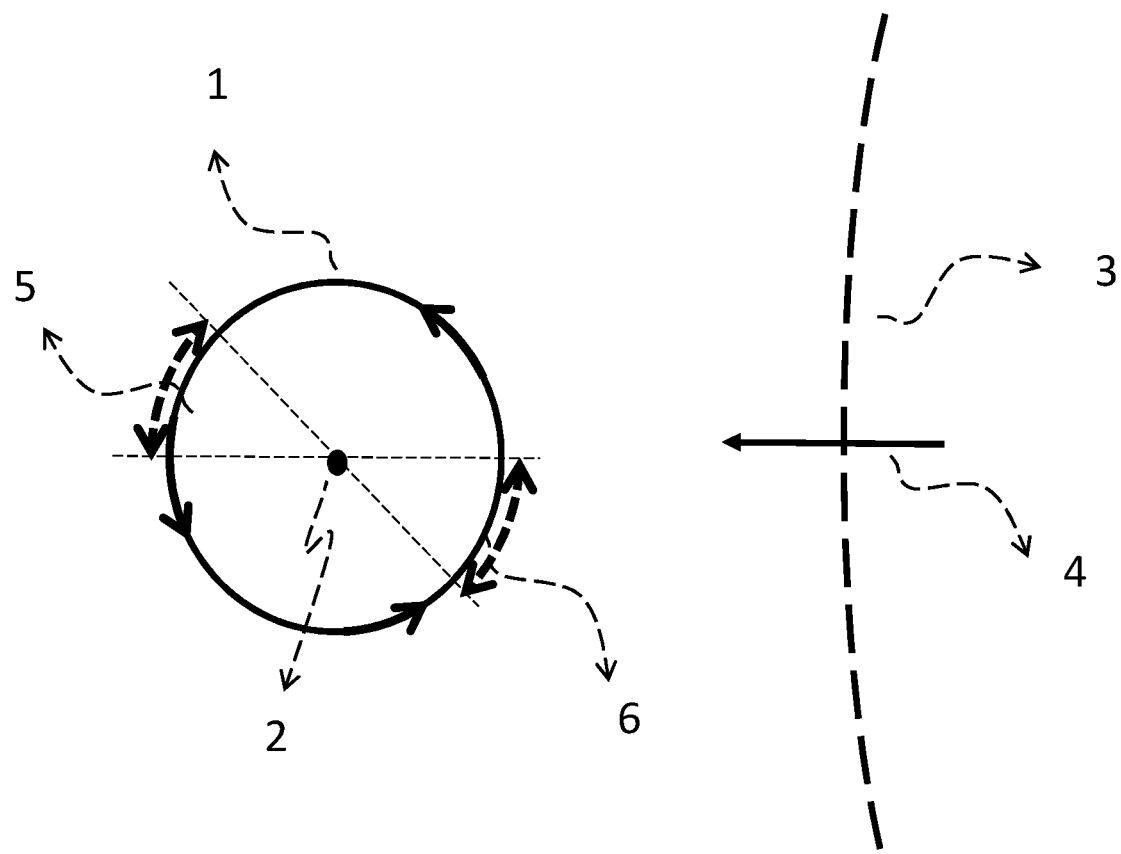
FIG. 1 shows a circular magnetic antenna, which is receiving signals coming from one direction.

FIG. 1 shows an example of mutual cancellation of received signals on different parts of a magnetic antenna when the target signal only comes from one direction. In FIG. 1, the magnetic antenna is a circular wired antenna 1, and the signal 3 is coming from right to left (as indicated by the arrow 4). 2 indicates the center of the circle. 5 and 6 indicate the two counterparts of the antenna. 5 and 6 are in symmetry with respect to the center of the circle 2. Because the signal wavelength is much longer than the size of the antenna, 5 and 6 receive similar signals at any one moment. Since they are wired in opposite directions, most of the signals captured by these two parts cancel each other. The cancelation occurs all over the magnetic antenna, and is not limited to parts 5 and 6. Therefore, the final signal generated by the entire receiver antenna is significantly reduced.

Figure 2:
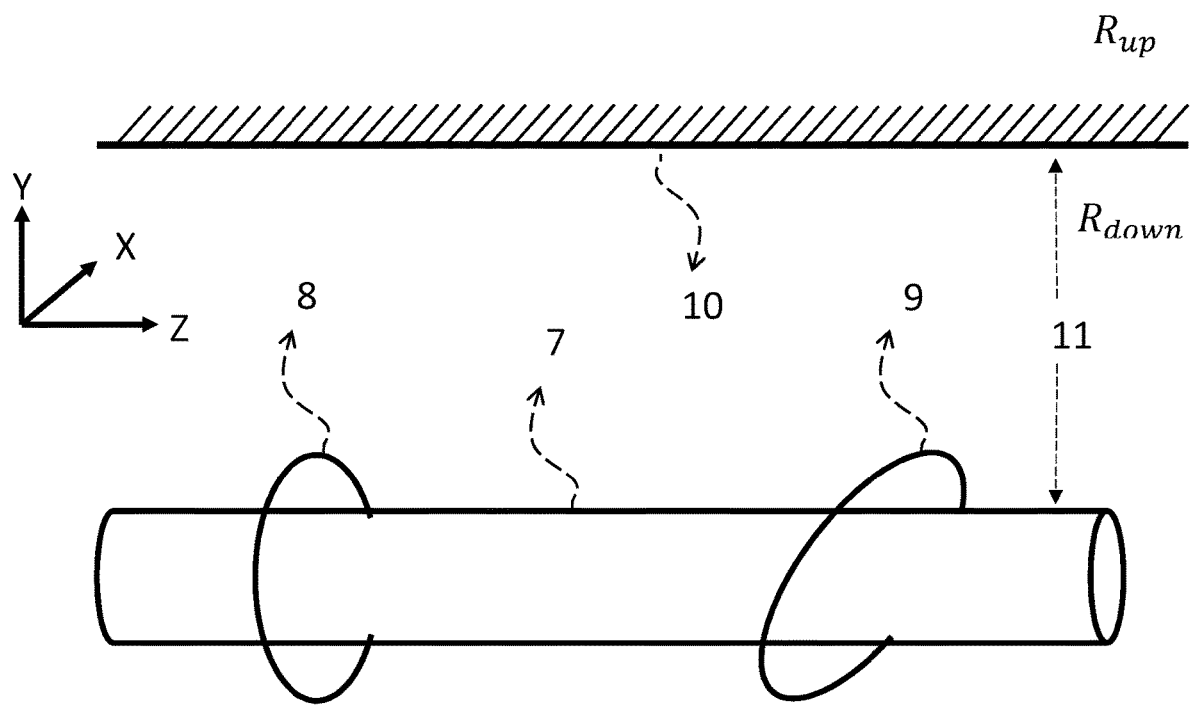
FIG. 2 shows a one-transmitter-one-receiver system in a model with two formation layers.

FIG. 2 shows a simplified geosteering tool in a model with two formation layers. The tool mandrel 7 is usually made of metal, and the tool is laid along the Z-axis. 8 is a transmitter, which is also placed along the Z-axis. 9 is a receiver, a tilt coil on the mandrel. 10 is the layer boundary, and 11 is the distance from the tool to the boundary (DTB). The two layers have different resistivity, $R_{up}$ and $R_{down}$. The effective signals 10 used to detect the boundary position are the signals reflected from the layer boundary. The DTB 11 can be calculated by the reflected signal captured by receiver 9. Hence, in the case of geosteering, the effective signals are indeed coming from one direction. The conventional magnetic antenna receives very weak effective signals for the reasons illustrated in FIG. 1.

Figure 3:
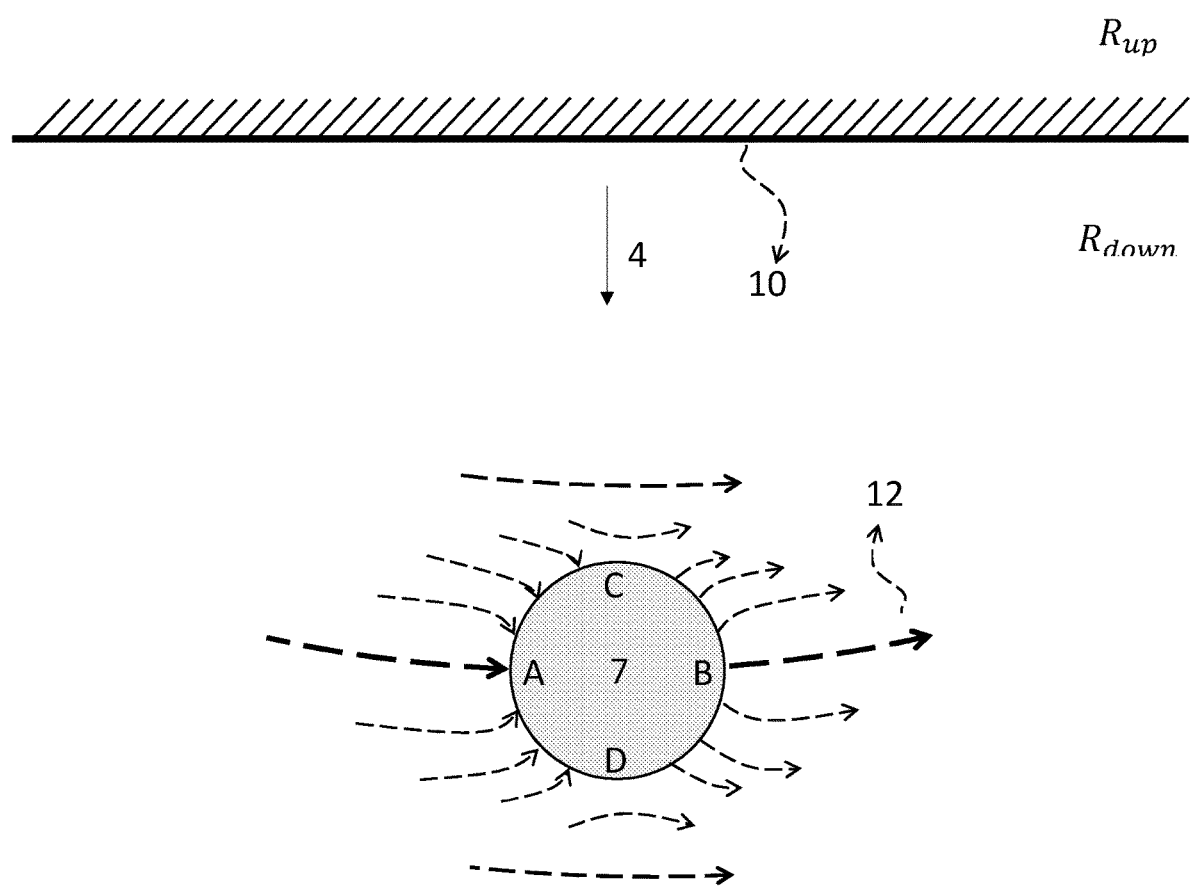
FIG. 3 shows an electric field distribution around a receiver in a model with two formation layers.

FIG. 3 illustrates an E field in the XY plane while the receiver is lying along the Z-axis. As in FIG. 2, the transmitter is placed along the Z-axis, and the model has two layers with resistivity $R_{up}$ and $R_{down}$ respectively. 7 indicates the mandrel, which is made of metal. 10 indicates the boundary between the two layers, and 4 indicates the reflected signal direction. The dashed arrow lines, indicated by 12, are E field lines. The lengths of the E field lines 12 indicate the strength of the E field. Because the mandrel is made of metal, there is no tangent electric field on the mandrel surface. A, B, C, and D are four points on or near the surface of the mandrel 7. $E_A$ is close to $E_B$, where E is the electric field with the direction of the electric field pointed to the center of mandrel. The strengths of the electric field at locations C and D are almost equal to 0, whereas the strengths of the electric field are at their maximum value at locations A and B. If an electric antenna is set on the surface of the mandrel, then the strength of the received E field will be a sine curve as the tool mandrel rotates. This signal can be used to detect the distance from the tool to the formation boundary. This process is similar to the signal processing used in conventional geosteering tools, but the strength of the signal is much stronger, especially when the formation boundary is far away from the tool.

Figure 4:
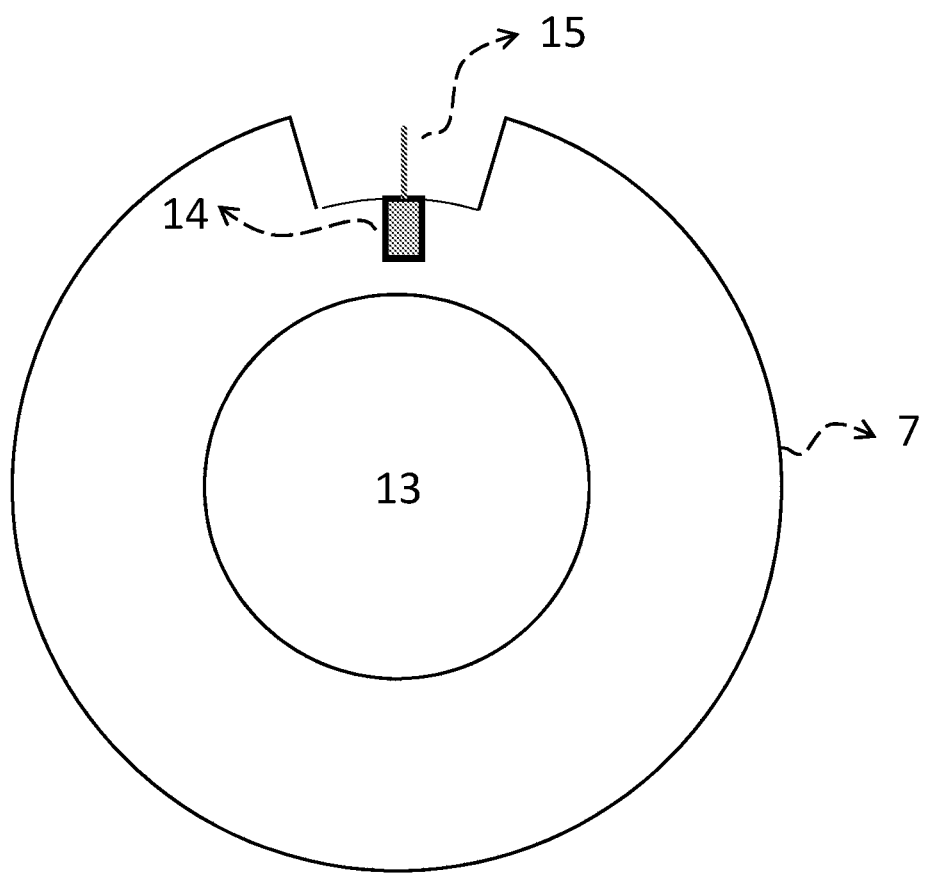
FIG. 4 shows an E field antenna installed on the bottom of a groove.

FIG. 4 shows one embodiment of an E field antenna installed on the bottom of a groove. Unlike conventional magnetic antennas, which are closed and can be treated as a magnetic dipole, the E field antenna detects electric field directly. 13 is the cavity or lumen of the mandrel 7, 14 is the circuit part of an E field antenna, which is usually embedded inside the mandrel, and 15 is the probe/antenna of the E field antenna system. The E field antenna system is not limited to the type shown in the figure; it can be any type of E field antenna generally known in the field. The effective signal is the same as the reflected signal as shown in FIG. 3. When the mandrel rotates, the signal captured by the E field antenna will be a sine curve. Because the amplitude and phase of the curve will change with respect to (i) the distance from the tool to the formation boundary and (ii) the resistivity ratio between materials on both sides of the boundary, one of ordinary skill in the art would readily use this sine curve to determine the boundary location.

Figure 5:
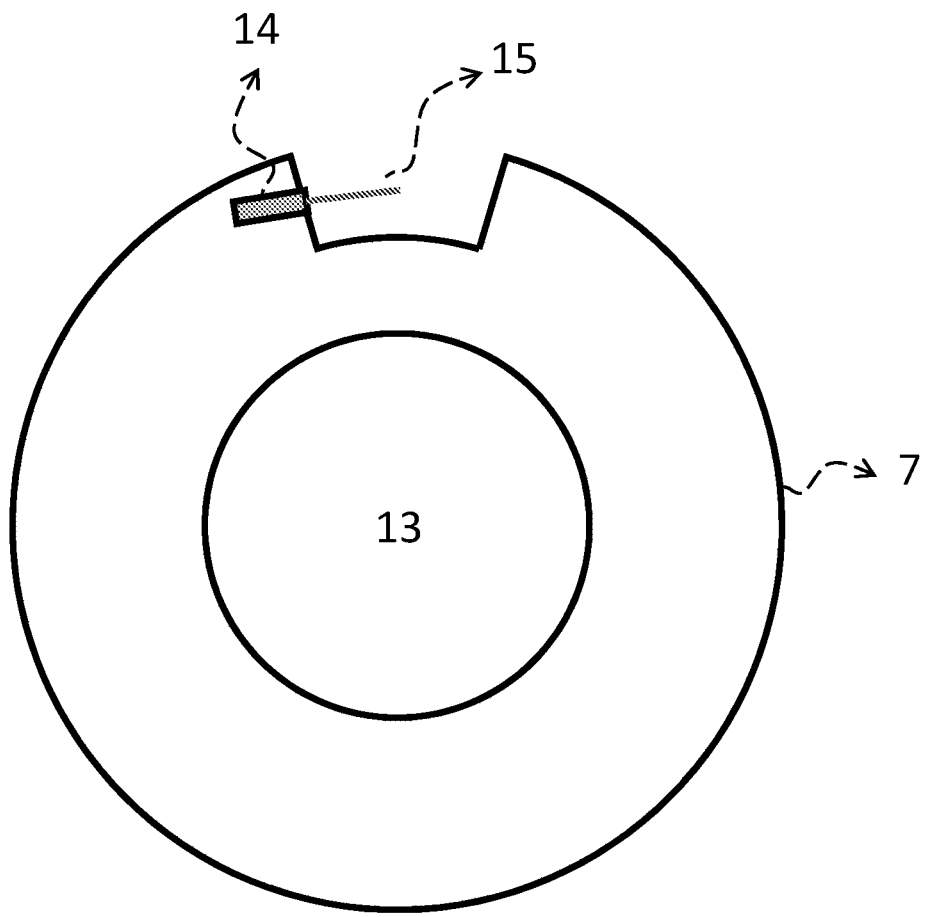
FIG. 5 shows an E field antenna installed on a side wall of a groove.

FIG. 5 shows one embodiment of an E field antenna installed on the side wall of a groove. The detection results should be similar to that from the E field antenna shown in FIG. 4. In general, the E field antenna can be installed on any place of the groove, or on the surface of the mandrel directly.

Figure 6:
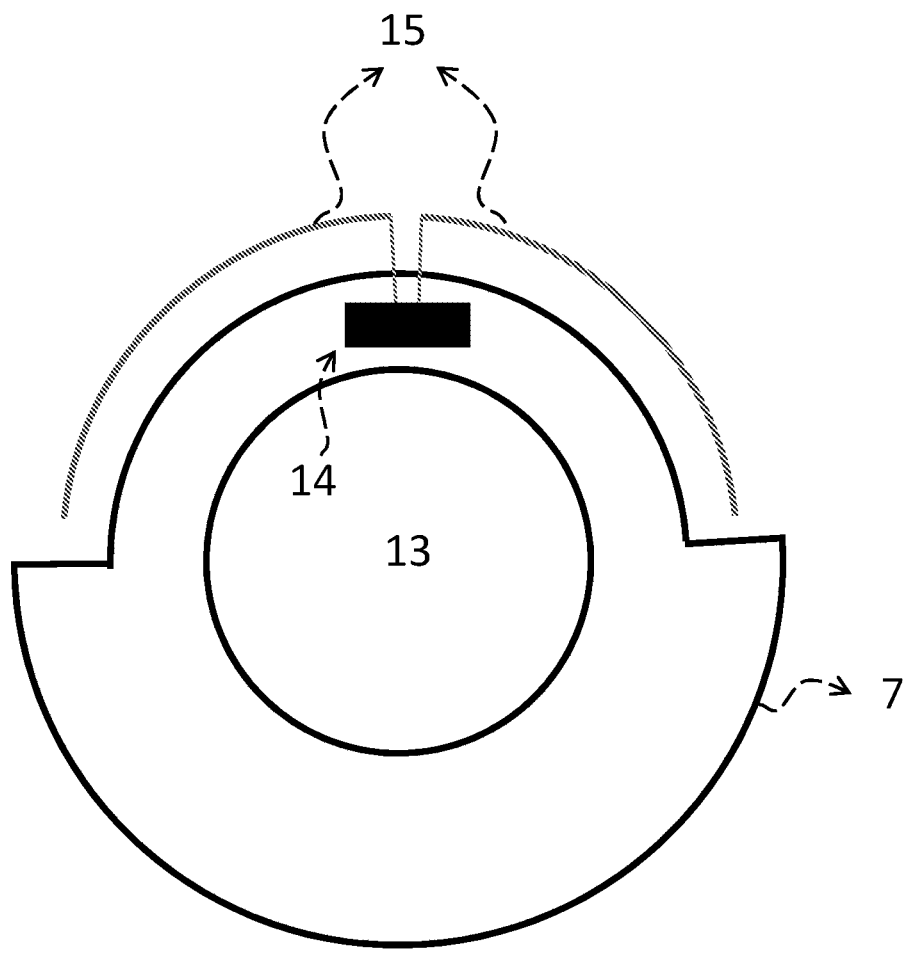
FIG. 6 shows an electric dipole E field antenna with two probes bent along a circle concentric to the mandrel.

FIG. 6 shows one embodiment of an electrical dipole E field antenna installed on or near the surface of a mandrel. As in FIG. 4, 7 is the mandrel, 13 is the cavity or lumen of the mandrel, 14 is the main part of the antenna system, and 15 are the two probes of the antenna, which are bent in a circle concentric to the mandrel. The open angle between the two probes is 180 degrees in this embodiment. However, one of ordinary skill in the art would readily configure this open angle to any other value other than 180°.

Figure 7:
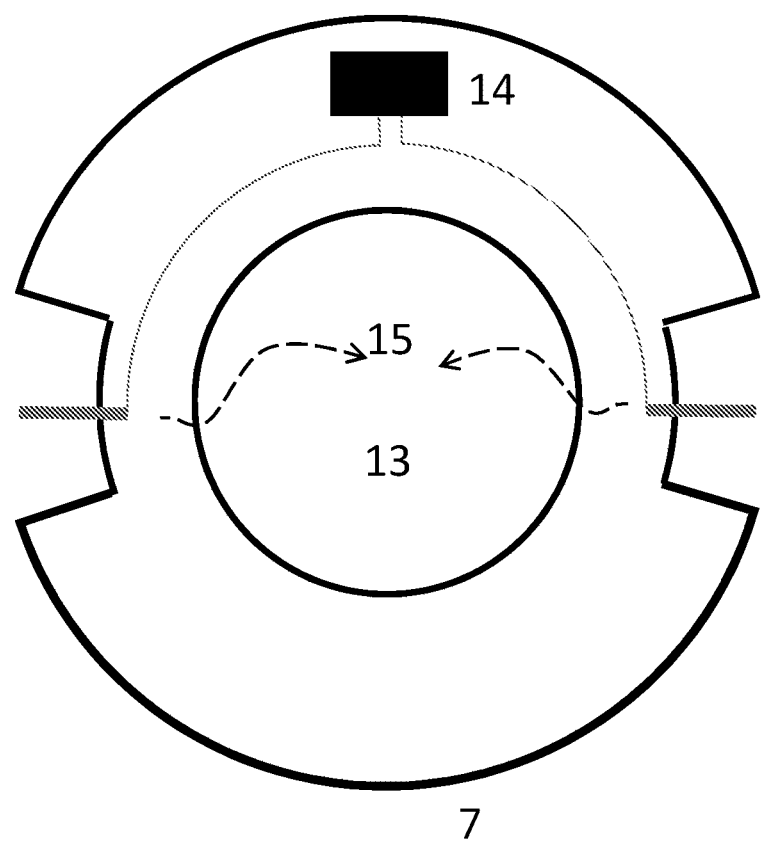
FIG. 7 shows an electric dipole E field antenna with two probes installed in two grooves.

FIG. 7 shows one embodiment of an electric dipole E field antenna. 7 is the mandrel, 13 is the cavity or lumen of the mandrel, 14 is the main part of the antenna system, and 15 are the two probes of the antenna. Unlike the antenna shown in FIG. 6, the two probes are installed in two grooves. In one embodiment, the angle between the two grooves is 180 degrees.

Figure 8:
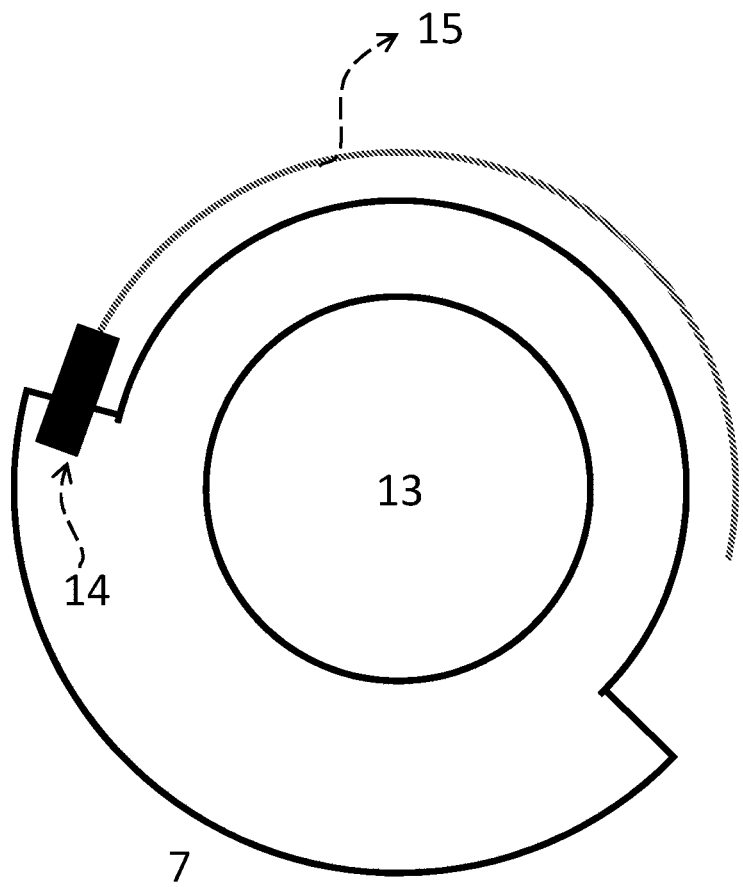
FIG. 8 shows an E field antenna with the probe bent along a circle concentric to the mandrel.

FIG. 8 shows another embodiment of an E field antenna with only one probe. The probe is bent in a circle concentric to the mandrel. The probe's open angle can be any angle. The E field antennas of the present invention are not limited to the examples shown in FIGS. 6-8.

Figure 9:
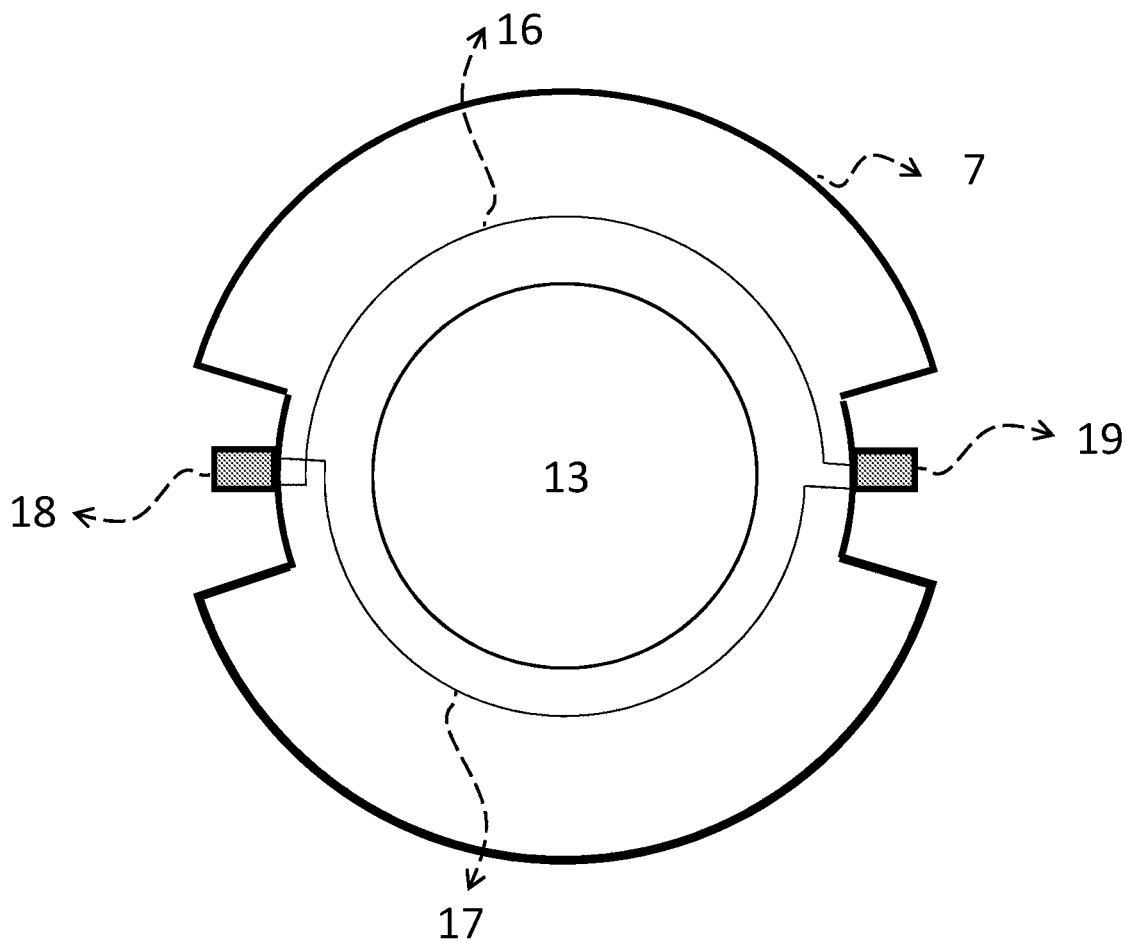
FIG. 9 shows a receiver system with two E field antennas connected in series.

Several E field antennas can be applied together to send/receive better effective signals. For example, FIG. 9 shows a receiver system with two E field antennas connected in series. 18 and 19 are two E field antennas, and lines 16 and 17 are the connection lines. For the reasons shown in FIG. 3, the E field reaches its maximum strength at locations A and B. If two E field antennas are placed at points A and B, and they are connected in series, the total signal strength increases.

Figure 10:
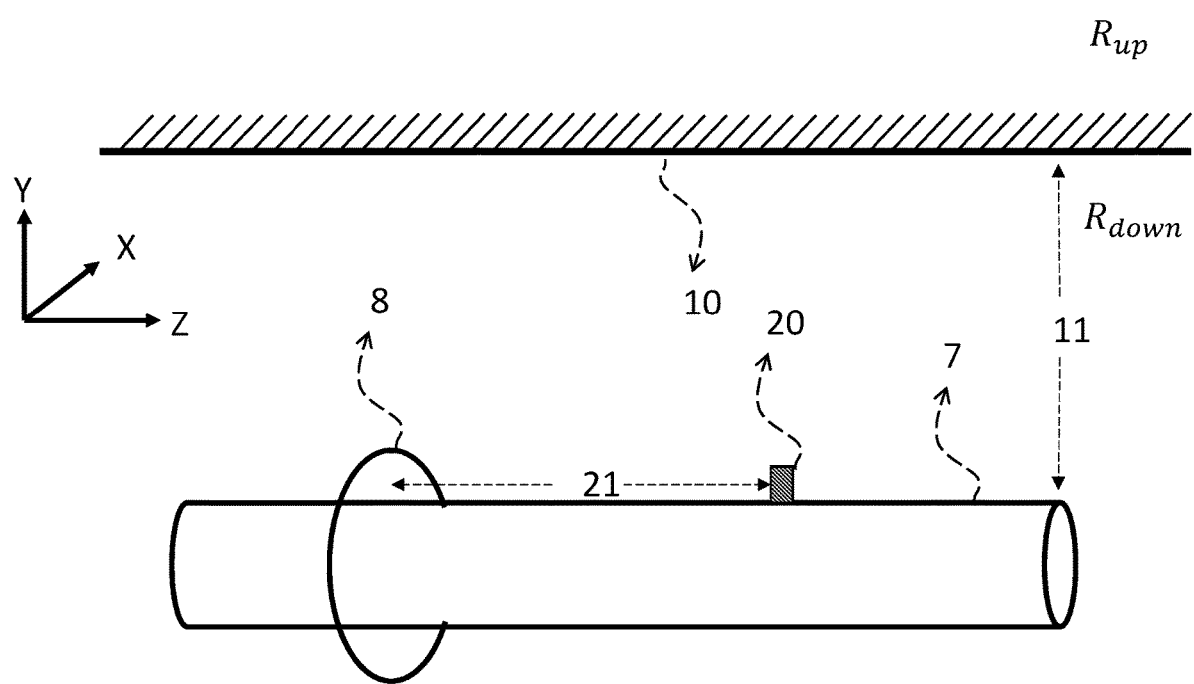
FIG. 10 shows one embodiment of a new geosteering system in a model with two formation layers.

FIG. 10 shows one embodiment of a new geosteering system in a model with two formation layers. In one embodiment, the new system has one transmitter and one receiver. Unlike conventional geosteering systems, the receiver 20 in the new system is an E field antenna. 21 is the spacing between the transmitter and the receiver. As in FIG. 2, 7 is the mandrel, 8 is the transmitter, 10 is the formation boundary, and 11 is the distance from the tool to the boundary (DTB). The transmitter 8 lies along the Z-axis, which is along the long axle of the system. The resistivity in the two layers are $R_{up}$ and $R_{down}$ respectively. If the DTB is fixed, and the new system is rotated, then the amplitude of the signal captured by the receiver will be a sine curve. The average of the sine curvature is the signal coming directly from the transmitter, and the difference between the maximum and minimum indicates the signal strength reflected from the boundary. The reflected signal strength measured by the new system would be much stronger than that obtained by the system of FIG. 2.

Figure 11:
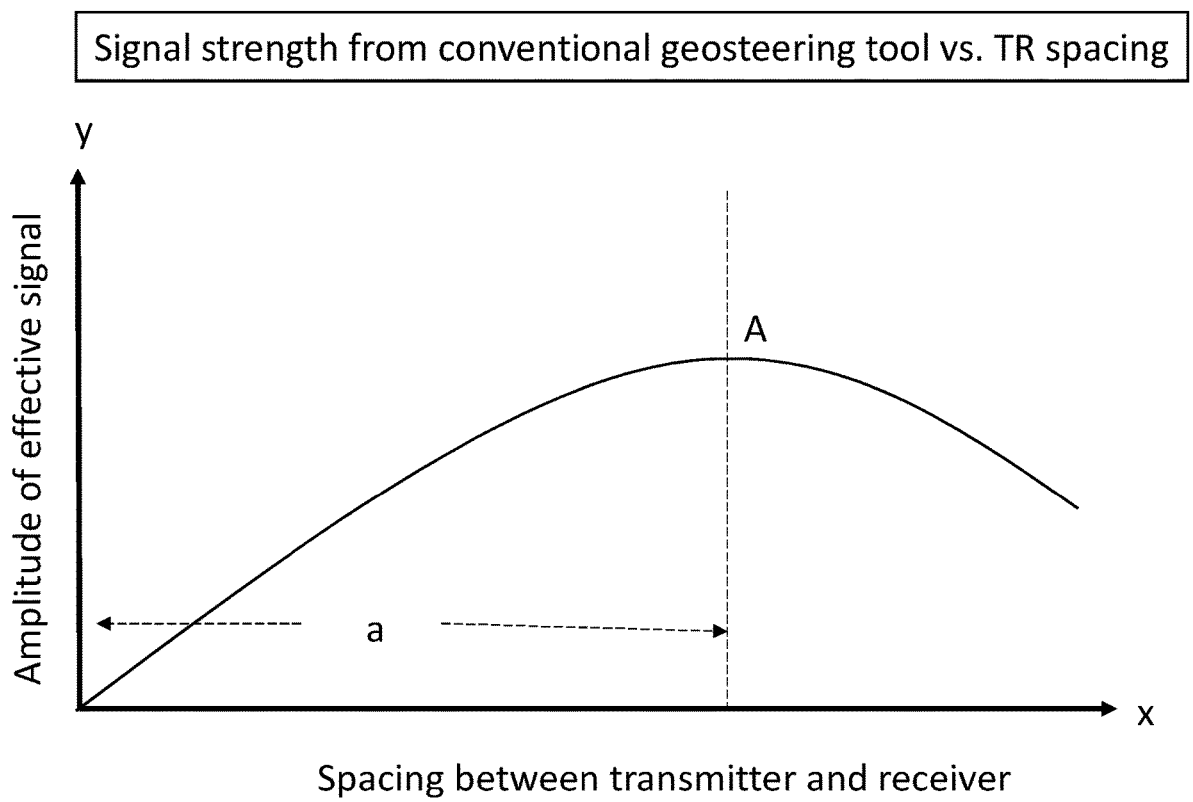
FIG. 11 shows the relationship between tool TR (transmitter receiver) spacing and amplitude of effective signal received by a conventional geosteering system.

FIG. 11 shows the relationship between the spacing between transmitter and receiver (TR spacing) and the amplitude of the effective signal received by a tilt coil antenna in a conventional geosteering tool. One embodiment of conventional geosteering tool is shown in FIG. 2, which has one transmitter and one receiver. The effective signal is $H_{zx}$, where H is the strength of the magnetic field, z indicates the transmitter is placed along the Z axis, x indicates that the received magnetic field strength is in the X direction. Because closed coils can be simplified to magnetic dipoles, the H field is calculated directly instead of the E field. When the DTB and the resistivity in the two layers are fixed, the effective signal $H_{zx}$ will change with respect to the TR spacing, which is shown as the curve in FIG. 11. The maximum amplitude of the effective signal received by the system reaches its maximum at point A, which defines the optimized TR spacing, indicated by 'a'. The optimized TR spacing indicates that conventional geosteering tools that only use magnetic antennas cannot be made very short. In contrast, the new geosteering tools of the present invention with E field antennas do not have such spacing limitation. In fact, as shown below, in the case of the new geosteering tools of the present invention, the shorter the TR spacing, the stronger the received signals will be.

Figure 12:
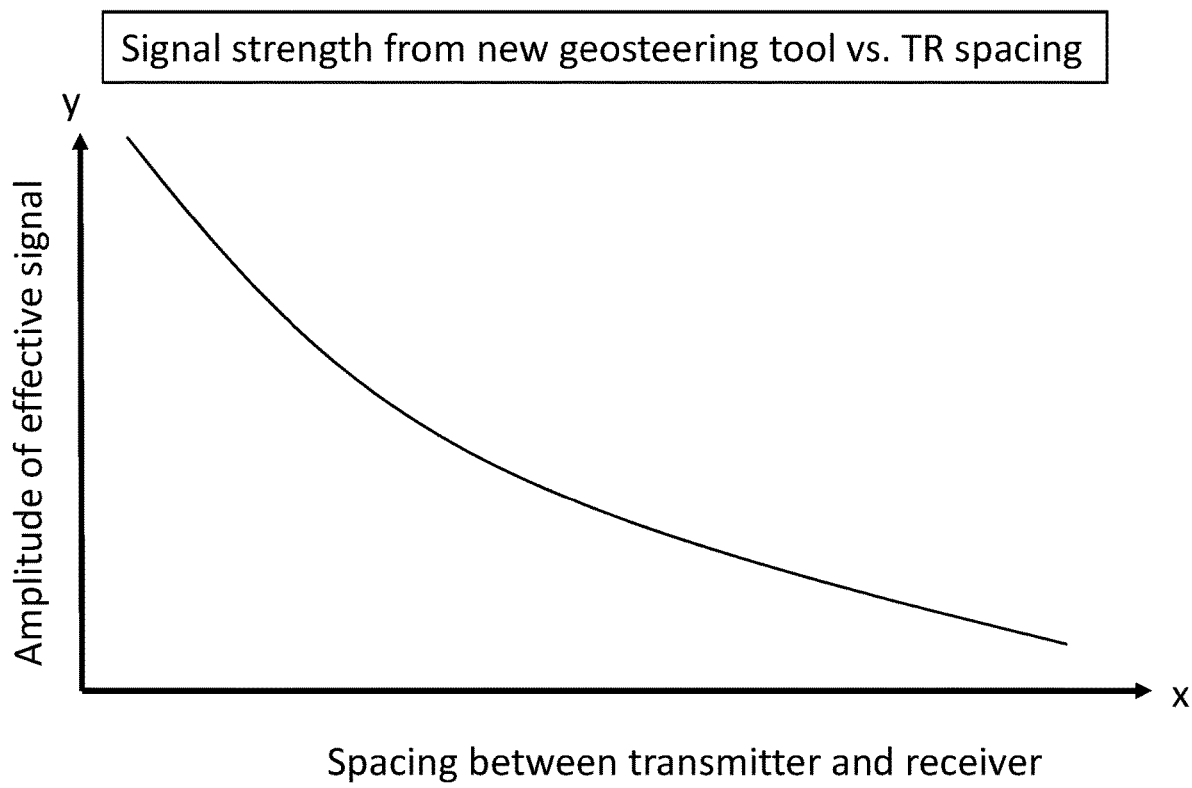
FIG. 12 shows the relationship between tool TR spacing and amplitude of effective signals received by a new geosteering system of the present invention.

FIG. 12 shows the relationship between the amplitude of the received effective signals and the TR spacing in the new geosteering system of the present invention with an E field antenna as the receiver. One embodiment of the new geosteering system is shown in FIG. 10. FIG. 12 shows that the shorter the TR spacing is, the stronger the received signal will be. It means that the new geosteering system tool can be very short, and can even be installed near a drill bit.

The above examples show that the new LWD tools with E field antennas can capture much stronger effective signals than conventional resistivity tools that only use magnetic antennas in various applications, such as geosteering. Moreover, the new resistivity tools of the present invention are capable of being much shorter than conventional ones. The E field antennas can also be applied to other LWD tools such as look ahead and triaxle induction tool.

Figure 13:
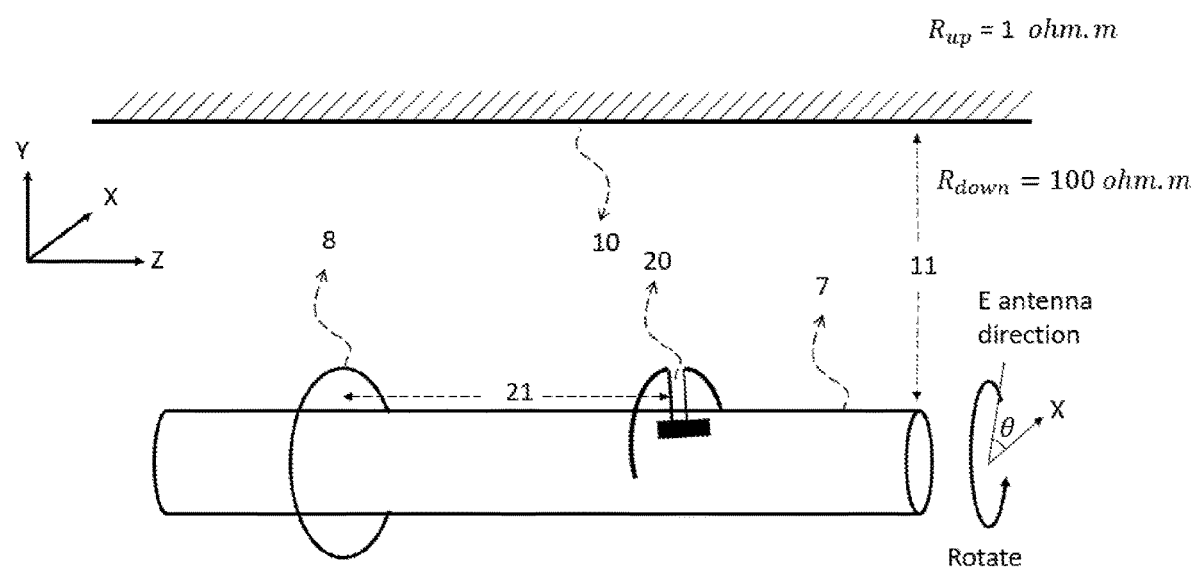
FIG. 13 shows a simple formation model where the new geosteering system of the present invention works.

FIG. 13 shows a simple formation model where the geosteering system of the present invention works. 7 is the mandrel, 8 is the transmitter, 10 is the formation boundary, and 11 is the distance from the tool to the boundary (DTB). The receiver 20 is an E field antenna, 21 is the spacing between the transmitter and the receiver. There are two formations in the model: a low resistivity layer of 1 ohm·meter, and a high resistivity layer of 100 ohm·meters. The apparatus moves along the horizontal direction, the Z-axis, while rotating around the Z-axis. In one embodiment, the E field antenna is an electric dipole antenna as shown in FIG. 6. The rotation angle, θ, is the angle between the opening direction of the electric dipole antenna and the X-axis. When the apparatus is rotating, the measured signal is a function of the rotation angle, θ, denoted by $S_{(\theta)}$. The output signal is an induced electromotive force (EMF), which is the detected electric strength multiplied by the tool length.

Figure 14A:
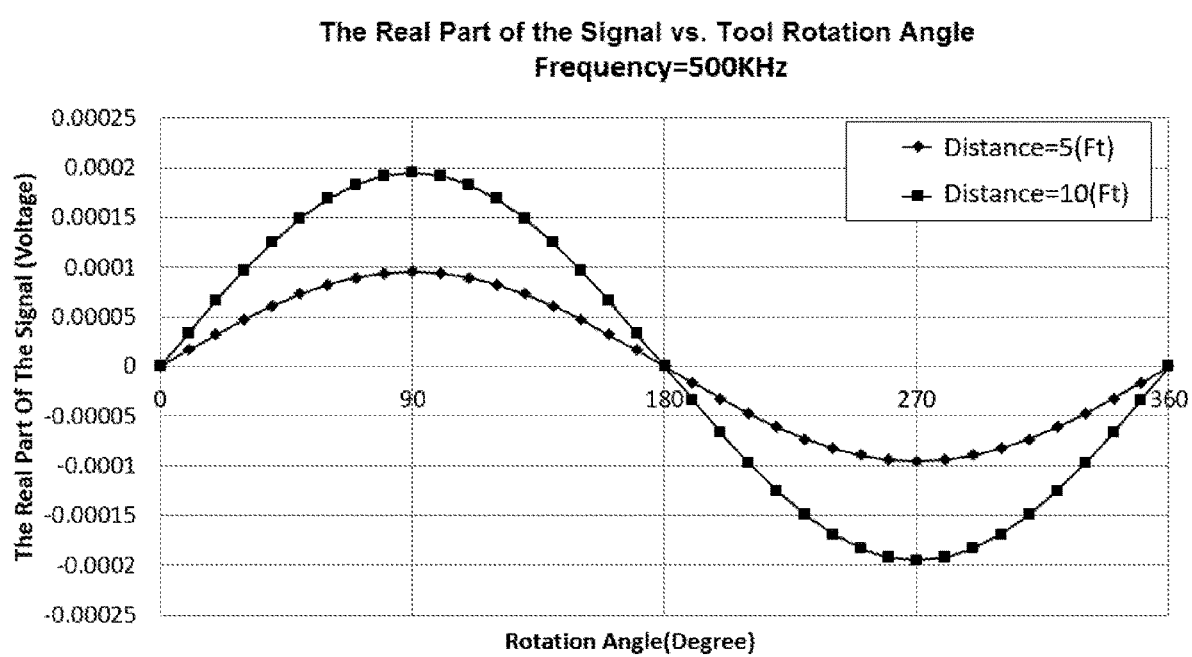
FIG. 14(A) shows the relationship between real part of signal and the rotation angle of the apparatus in the formation model shown in FIG. 13.
Figure 14B:
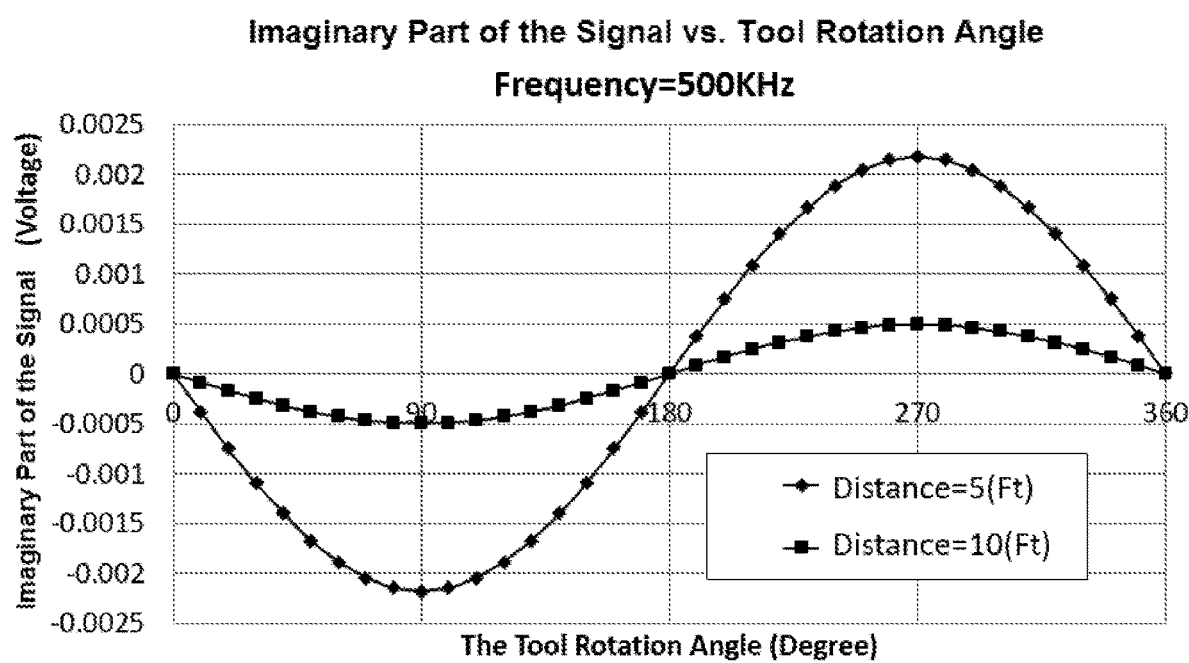
FIG. 14(B) shows the relationship between imaginary part of signal and the rotation angle of the apparatus in the formation model shown in FIG. 13.

FIG. 14(A)-(B) show how the signal changes with the rotation angle of the apparatus in the formation model shown in FIG. 13. Because the signal received at each moment is complex, it has real part and imaginary part. FIG. 14(A) shows the changes of the real part, and FIG. 14(B) shows the changes of the imaginary part. The curve marked with "Distance=5 feet" and "Distance=10 feet" are the simulated results when the apparatus is placed horizontally 5 feet or 10 feet away from the formation interface. In practice, usually only ratios (for example, Ratio1 and Ratio2 described below) are used to calculate the DTB to cancel the temperature effect. To do that, some auxiliary signal, usually constant signal, is added to lift the effective signal up. Given as an example, a constant signal with value 0.00025 is added in the real part of effective signal shown in 14(A). Let $S_{(\theta)}$ be the signal value after applying the constant value. Here θ is the tool rotation angle. Ratio1 is defined as the following:

$$\text{Ratio1} = \frac{S_{(\theta=\frac{\pi}{2})}}{S_{(\theta=\frac{3\pi}{2})}}$$

where $$S_{(\theta=\frac{\pi}{2})}$$

is the value when the E antenna is facing the formation interface, and $$S_{(\theta=\frac{3\pi}{2})}$$

is the value when the E antenna is facing away from the formation interface.

$$\text{When } DTB \text{ is 5 feet, Ratio1} = \frac{0.00020 + 0.00025}{-0.00020 + 0.00025} = 9,$$

$$\text{When } DTB \text{ is 10 feet, Ratio1} = \frac{0.000095 + 0.00025}{-0.000095 + 0.00025} = 2.2.$$

Obviously, when the constant value is large enough for the target DTB range (to avoid zero or negative value in the denominator), Ratio1 is monotone decreasing with respect to the DTB. So Ratio1 can be used to calculate DTB.

Ratio2 is defined as following:

$$\text{Ratio2} = \frac{S_{(\theta)}}{\text{Average}(S)}$$

where Average(S) is the average value of the signals measured in one cycle of the rotation of the apparatus. Similar to Ratio1, Ratio2 can be used to calculate DTB.

Similar idea of auxiliary signal has already been applied in conventional geosteering. When the receiver is a tilt antenna, $H_{zx}$ is the effective signal, which changes with respect to tool rotation angle θ. $H_{zz}$ is the auxiliary signal, which is a constant signal and boosts the whole effective signal up. So Ratio1 and Ratio2 can be applied to the conventional geosteering to calculate DTB too.

Figure 15:
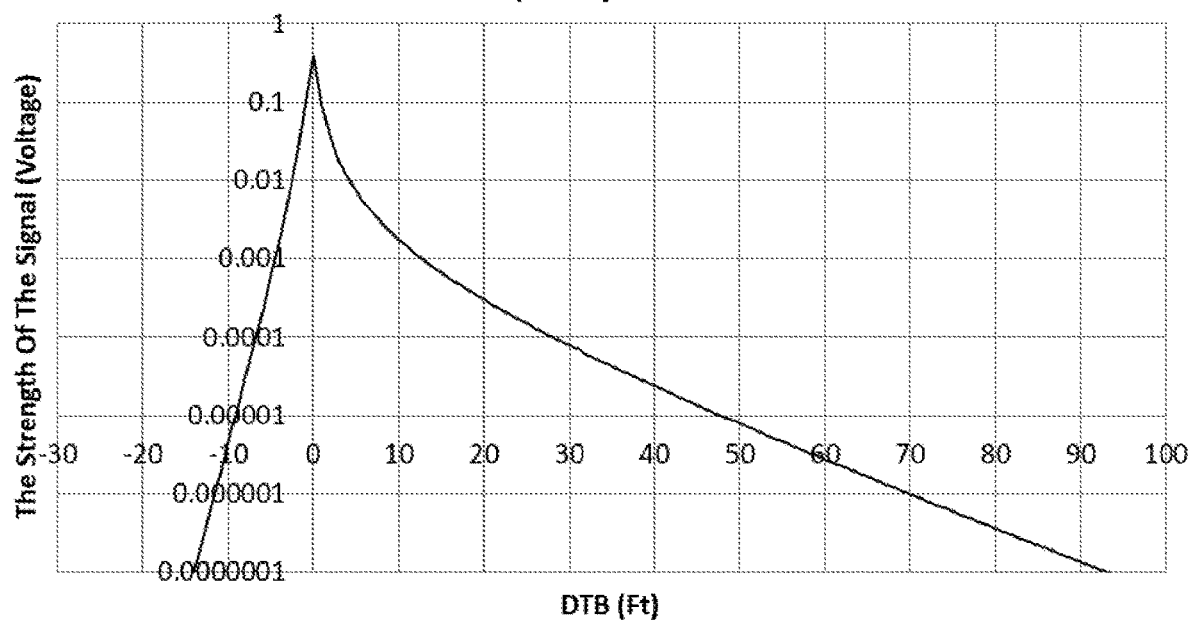
FIG. 15 shows the change of the amplitude of the received signal with respect to the distance from the apparatus to the formation boundary.

FIG. 15 shows the change of the amplitude of the received signal with respect to the distance from the apparatus to the formation interface. Here the amplitude is defined as $$\left\| S_{(\theta=\frac{\pi}{2})} - S_{(\theta=\frac{3\pi}{2})} \right\|.$$

where $$S_{(\theta=\frac{\pi}{2})} \text{ and } S_{(\theta=\frac{3\pi}{2})}$$

are defined as before. The figure shows that the amplitude is monotone decreasing on both sides of boundary (DTB=0), and may be used to calculate DTB.

Figure 16:
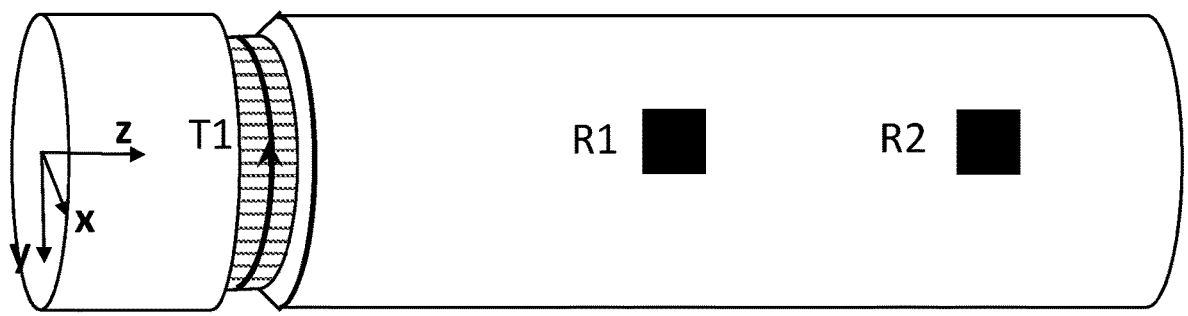
FIG. 16 shows one embodiment of a one-transmitter-two receiver geosteering system.
Figure 17:
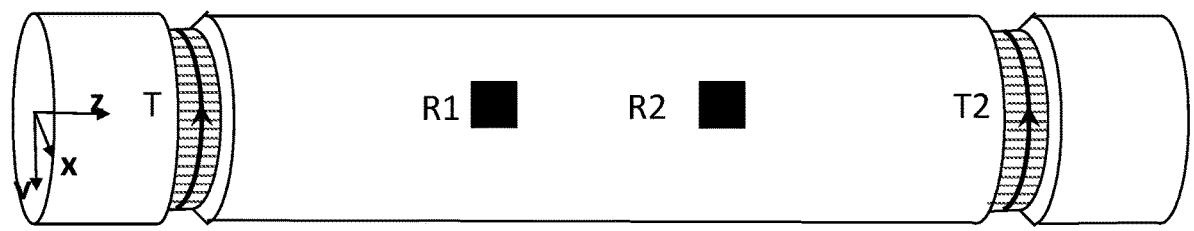
FIG. 17 shows one embodiment of a two-transmitter-two-receiver geosteering system.

FIG. 16 and FIG. 17 show different embodiments of the geosteering tools. FIG. 16 shows a one-transmitter-two receiver geosteering system. FIG. 17 shows a two-transmitter-two receiver geosteering system, where the two receivers are sandwiched by the two transmitters. All the receivers shown in FIG. 16 and FIG. 17 are E field antennas. In another embodiment, one or more of the receivers could be conventional H field antennas. The system design and data processing are similar to that of a conventional geosteering tool.

In one embodiment of the present invention, all E antennas serve as receivers. In another embodiment, some E antennas, such as dipole antennas, can be transmitters too. By the reciprocity principle of electromagnetic, the results of using E antennas as transmitters and traditional antennas as receivers would be the same as the examples described above. In fact, when both transmitters and receivers are E antennas, the measured results could be even better.

In one embodiment, the present invention provides a resistivity logging tool comprising one or more transmitting antennas and one or more receiving antennas, wherein at least one of the transmitting antennas or one of the receiving antennas is an electric field antenna. In one embodiment, the electric field antenna comprises one or two probes. In one embodiment, the one or two probes are each configured as an arch concentric to the circumference of the mandrel of the tool.

In one embodiment, the above resistivity logging tool comprises one transmitting antenna and two receiving antennas. In another embodiment, the tool comprises two transmitting antennas and two receiving antennas.

In one embodiment, the tool of the present invention is a logging-while-drilling tool comprising a mandrel that comprises transmitting antennas and receiving antennas. In one embodiment, the tool is a geosteering tool. In another embodiment, the tool is a look ahead tool. In yet another embodiment, the tool is a triaxial induction tool.

In one embodiment, the present invention provides a method of using the resistivity logging tool disclosed herein. The method comprises (i) rotating the tool in a formation and measuring signals received at one or more receiving antennas at different tool rotation angles; and (ii) calculating formation boundary information based on the signals received at the receiving antennas. In one embodiment, the formation boundary information comprises distance from the tool to a formation boundary.

In one embodiment, the calculation in step (ii) comprises calculating $$\frac{S_{(\theta)}}{S_{(\theta+\pi)}},$$

wherein θ is the tool rotation angle, $S_{(\theta)}$ is signal measured at tool rotation angle θ, θ+π is the rotation angle after the tool rotates 180 degrees from the initial angle θ. and $S_{(\theta+\pi)}$ is the signal measured at rotation angle θ+π.

In one embodiment, the calculation in step (ii) comprises calculating $S_{(\theta)} - S_{(\theta+\pi)}$, wherein θ is the tool rotation angle, $S_{(\theta)}$ is signal measured at tool rotation angle θ, θ+π is the rotation angle after the tool rotates 180 degrees from the initial angle θ. and $S_{(\theta+\pi)}$ is the signal measured at rotation angle θ+π.

In one embodiment, the calculation in step (ii) comprises calculating $$\frac{S_{(\theta)}}{\text{Average}(S_{(\theta)})},$$

wherein θ is the tool rotation angle, $S_{(\theta)}$ is signal measured at tool rotation angle θ, and Average($S_{(\theta)}$) is an arithmetic average of the measured signals.

In one embodiment, the tool comprises two receiving antennas, and calculation in step (ii) comprises calculating $$\frac{S2_{(\theta)}}{S1_{(\theta)}},$$

wherein θ is the tool rotation angle, and $S1_{(\theta)}$ and $S2_{(\theta)}$ are respectively signals measured by the two receiving antennas at tool rotation angle θ.

In one embodiment, the tool comprises two receiving antennas, and calculation in step (ii) comprises calculating $$\frac{\text{Average}(S2_{(\theta)})}{\text{Average}(S1_{(\theta)})},$$

wherein θ is the tool rotation angle, and Average($S1_{(\theta)}$) and Average($S2_{(\theta)}$) are respectively arithmetic averages of signals measured by the two receiving antennas.

In one embodiment, the tool comprises two receiving antennas and two transmitting antennas, and calculation in step (ii) comprises calculating $$\frac{S_{12(\theta)} S_{21(\theta)}}{S_{11(\theta)} S_{22(\theta)}},$$

wherein θ is the tool rotation angle, and $S_{ij(\theta)}$ is signal measured at tool rotation angle θ by receiving antenna j under the effect of transmitting antenna i, where i, j=1 or 2.

In one embodiment, the tool comprises two receiving antennas and two transmitting antennas, and calculation in step (ii) comprises calculating $$\frac{\text{Average}(S_{12(\theta)})\text{Average}(S_{21(\theta)})}{\text{Average}(S_{11(\theta)})\text{Average}(S_{22(\theta)})},$$

wherein θ is the tool rotation angle, and Average($S_{ij(\theta)}$) is an arithmetic average of signals measured at tool rotation angle θ by receiving antenna j under the effect of transmitting antenna i, where i, j=1 or 2.

What is claimed is:
1. A resistivity logging tool comprising a mandrel, at least one transmitting antenna mounted on the mandrel and at least one receiving antenna mounted on the mandrel, wherein at least one of the transmitting antenna or the receiving antenna is an electric field antenna, and the electric field antenna comprises:
(1) two probes, which are respectively bent along the surface of the mandrel at different directions; or
(2) a single probe, which is bent into a partial circle concentric to the mandrel along the surface of the mandrel, wherein the partial circle is about half of a full circle; or
(3) wherein the mandrel comprises two grooves respectively on two opposite sides, and the electric field antenna comprises two probes, with one of the two probes installed on one of the two grooves, and the other probe installed on the other groove.

2. The tool of claim 1, wherein the tool is a geosteering tool, a look ahead tool, or a triaxial induction tool.

3. A method of using the resistivity tool of claim 1, comprising the steps of:
(a) rotating the tool in a formation and measuring signals received at the one or more receiving antennas at different tool rotation angles; and
(b) calculating formation boundary information based on the signals received at the receiving antennas.

4. The method of claim 3, wherein the formation boundary information comprises distance from the tool to a formation boundary.

5. The method of claim 3, wherein said calculation in step (b) comprises calculating $$\frac{S_{(\theta)}}{S_{(\theta+\pi)}},$$

wherein $\theta$ is tool rotation angle, $S_{(\theta)}$ is signal measured at tool rotation angle $\theta$, $\theta+\pi$ is rotation angle after the tool rotates 180 degrees from the initial angle $\theta$, and $S_{(\theta+\pi)}$ is signal measured at rotation angle $\theta+\pi$.

6. The method of claim 3, wherein said calculation in step (b) comprises calculating $S_{(\theta)}-S_{(\theta+\pi)}$, wherein $\theta$ is tool rotation angle, $S_{(\theta)}$ is signal measured at tool rotation angle $\theta$, $\theta+\pi$ is rotation angle after the tool rotates 180 degrees from the initial angle $\theta$, and $S_{(0+\pi)}$ is signal measured at rotation angle $\theta+\pi$.

7. The method of claim 3, wherein said calculation in step (b) comprises calculating $$\frac{S_{(\theta)}}{\text{Average}(S_{(\theta)})},$$

wherein $\theta$ is tool rotation angle, $S_{(\theta)}$ is signal measured at tool rotation angle $\theta$, $\theta+\pi$ and $\text{Average}(S_{(\theta)})$ is an arithmetic average of the measured signals.

8. The method of claim 3, wherein said tool comprises two receiving antennas, and said calculation in step (b) comprises calculating $$\frac{S2_{(\theta)}}{S1_{(\theta)}},$$

wherein $\theta$ is tool rotation angle, and $S1_{(\theta)}$ and $S2_{(\theta)}$ are respectively signals measured by the two receiving antennas at tool rotation angle $\theta$.

9. The method of claim 3, wherein said tool comprises two receiving antennas, and said calculation in step (b) comprises calculating $$\frac{\text{Average}(S2_{(\theta)})}{\text{Average}(S1_{(\theta)})},$$

wherein $\theta$ is tool rotation angle, and $\text{Average}(S1_{(\theta)})$ and $\text{Average}(S2_{(\theta)})$ are respectively arithmetic averages of signals measured by the two receiving antennas.

10. The method of claim 3, wherein said tool comprises two receiving antennas and two transmitting antennas, and said calculation in step (b) comprises calculating $$\frac{S_{12(\theta)}S_{21(\theta)}}{S_{11(\theta)}S_{22(\theta)}},$$

wherein $\theta$ is tool rotation angle, and $S_{ij(\theta)}$ is signal measured at tool rotation angle $\theta$ by receiving antenna j under the effect of transmitting antenna i, where i, j=1 or 2.

11. The method of claim 3, wherein said tool comprises two receiving antennas and two transmitting antennas, and said calculation in step (b) comprises calculating $$\frac{\text{Average}(S_{12(\theta)})\text{Average}(S_{21(\theta)})}{\text{Average}(S_{11(\theta)})\text{Average}(S_{22(\theta)})},$$

wherein $\theta$ is tool rotation angle, and $\text{Average}(S_{ij(\theta)})$ is an arithmetic average of signals measured at tool rotation angle $\theta$ by receiving antenna j under the effect of transmitting antenna i, where i, j=1 or 2.

12. The tool of claim 1, wherein the electric field antenna comprises two probes, which are respectively bent along the surface of the mandrel at different directions.

13. The tool of claim 12 wherein the two probes are respectively bent into a partial circle concentric to the mandrel.

14. The tool of claim 13 wherein the partial circle is about a quarter of a full circle.

15. The tool of claim 1, wherein the electric field antenna comprises a single probe, which is bent into a partial circle concentric to the mandrel along the surface of the mandrel, and the partial circle is about half of a full circle.

16. The tool of claim 1, wherein the mandrel comprises two grooves respectively on two opposite sides, and the electric field antenna comprises two probes installed on the two grooves of the mandrel.

* * * * *